United States Patent
Mitamura

(10) Patent No.: US 10,263,258 B2
(45) Date of Patent: Apr. 16, 2019

(54) AIR ELECTRODE MATERIAL, AIR ELECTRODE, METAL-AIR BATTERY, AND FUEL CELL

(71) Applicant: Sharp Kabushiki Kaisha, Sakai, Osaka (JP)

(72) Inventor: Keigo Mitamura, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 86 days.

(21) Appl. No.: 15/644,889

(22) Filed: Jul. 10, 2017

(65) Prior Publication Data
US 2018/0026272 A1    Jan. 25, 2018

(30) Foreign Application Priority Data

Jul. 21, 2016 (JP) .................. 2016-143465

(51) Int. Cl.
| | | |
|---|---|---|
| H01M 2/00 | (2006.01) | |
| H01M 4/86 | (2006.01) | |
| H01M 4/38 | (2006.01) | |
| H01M 4/90 | (2006.01) | |
| H01M 12/06 | (2006.01) | |
| H01M 8/1018 | (2016.01) | |

(52) U.S. Cl.
CPC .......... *H01M 4/8657* (2013.01); *H01M 4/38* (2013.01); *H01M 4/8673* (2013.01); *H01M 4/9016* (2013.01); *H01M 12/06* (2013.01); *H01M 4/381* (2013.01); *H01M 4/8652* (2013.01); *H01M 4/9025* (2013.01); *H01M 12/065* (2013.01); *H01M 2008/1095* (2013.01); *H01M 2300/0014* (2013.01)

(58) Field of Classification Search
CPC ..................................................... H01M 2/00
See application file for complete search history.

(56) References Cited

U.S. PATENT DOCUMENTS

2009/0011307 A1* 1/2009 Lee ................... B82Y 30/00
                                                                429/528

FOREIGN PATENT DOCUMENTS

| JP | 2005-270955 A | 10/2005 |
|---|---|---|
| JP | 2012-074234 A | 4/2012 |

* cited by examiner

*Primary Examiner* — Jacob B Marks
(74) *Attorney, Agent, or Firm* — Keating & Bennett, LLP

(57) ABSTRACT

An air electrode material according to the present disclosure contains a plurality of composite particles, wherein each of the composite particles contains a core particle and a plurality of covering particles covering the core particle, the core particle is formed of a material with catalytic activity for an oxygen reduction reaction, the covering particles are formed of an electrically conductive material and are mechanically bonded to the core particles or other covering particles, and the median size of the core particles ranges from 100 to 1000 times the average primary particle size of the covering particles.

8 Claims, 5 Drawing Sheets

AIR ELECTRODE MATERIAL, AIR ELECTRODE, METAL-AIR BATTERY, AND FUEL CELL

BACKGROUND

1. Field

The present disclosure relates to an air electrode material, an air electrode, a metal-air battery, and a fuel cell.

2. Description of the Related Art

The following oxygen reduction reaction (electrode reaction) (1) or (2) occurs in an air electrode of a metal-air battery or an air electrode of a polymer electrolyte fuel cell.

$$O_2 + 2H_2O + 4e^- \rightarrow 4OH^- \quad (1)$$

$$O_2 + 4H^+ + 4e^- \rightarrow H_2O \quad (2)$$

These oxygen reduction reactions occur at a three-phase interface between gas ($O_2$), liquid ($H_2O$), and solid (catalyst). Because these oxygen reduction reactions are electrochemical reactions, the air electrodes should have high electric conductivity.

Known air electrodes are produced by kneading a catalyst, an electrically conductive agent, and a binder. However, the dispersion of these constituent materials is difficult to control. Thus, an efficient electrically conductive path is difficult to form, and a high discharge current density results in a low discharge voltage. Thus, in order to improve the electric conductivity of an air electrode, a carbon powder loaded with a noble metal or a catalyst powder covered with a carbon film is used as a material for air electrodes (see Japanese Unexamined Patent Application Publication No. 2012-74234, for example).

Meanwhile, there is a powder processing apparatus for forming composite particles containing approximately 15-nm titanium oxide mechanically bonded to the surface of approximately 30-μm silica sand (see Japanese Unexamined Patent Application Publication No. 2005-270955, for example).

The use of a carbon powder loaded with a noble metal in the production of an air electrode increases production costs due to the expensive noble metal. When an air electrode is produced from a catalyst powder covered with a carbon film, the catalyst particles are covered with the carbon film, and a gas-liquid-solid three-phase interface needed for an electrode reaction in the air electrode cannot be stably formed. This results in variations in the electrical characteristics of metal-air batteries and fuel cells.

SUMMARY

In view of such situations, the present disclosure provides an air electrode material from which an air electrode catalyst layer with a low volume resistivity can be formed at low production costs.

The present disclosure provides an air electrode material that contains a plurality of composite particles, wherein each of the composite particles contains a core particle and a plurality of covering particles covering the core particle, the core particle is formed of a material with catalytic activity for an oxygen reduction reaction, the covering particles are formed of an electrically conductive material and are mechanically bonded to the core particles or other covering particles, and the median size of the core particles ranges from 100 to 1000 times the average primary particle size of the covering particles.

DESCRIPTION OF THE EMBODIMENTS

Figure 1:
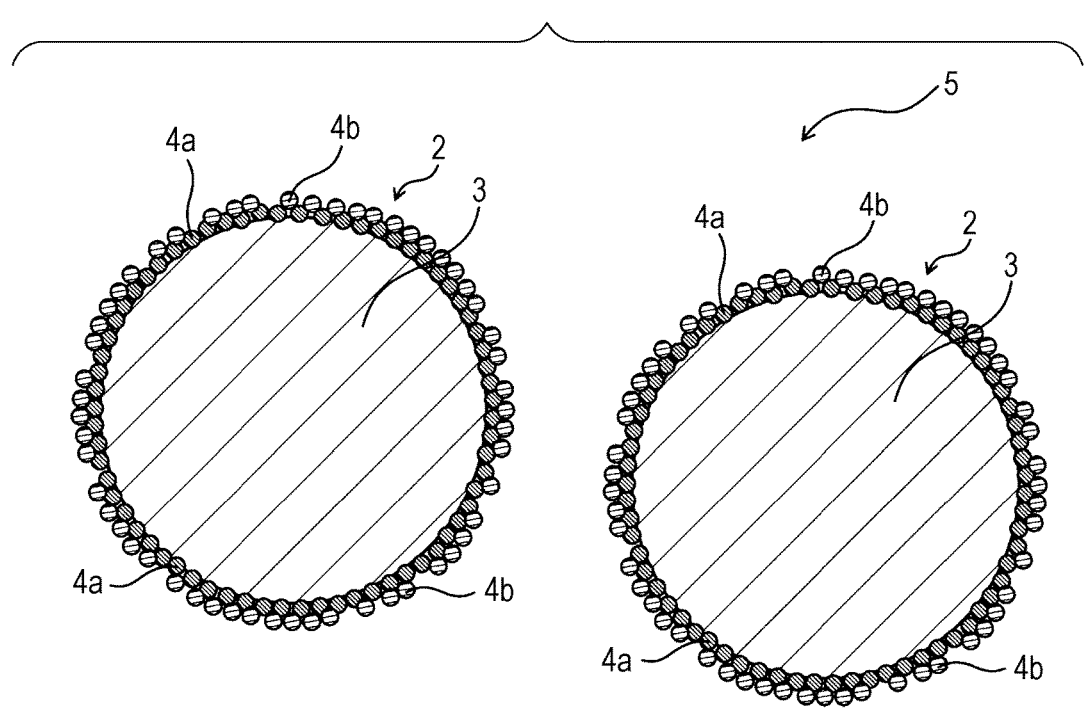
FIG. 1 is a schematic cross-sectional view of an air electrode material according to an embodiment of the present disclosure.

An air electrode material according to an embodiment of the present disclosure contains a plurality of composite particles, wherein each of the composite particles contains a core particle and a plurality of covering particles covering the core particle, the core particle is formed of a material with catalytic activity for an oxygen reduction reaction, the covering particles are formed of an electrically conductive material and are mechanically bonded to the core particles or other covering particles, and the median size of the core particles ranges from 100 to 1000 times the average primary particle size of the covering particles.

In the air electrode material, the core particles of the composite particles may have a median size in the range of 3 to 100 μm, and the covering particles may have an average primary particle size in the range of 10 to 100 nm. Thus, the core particles and the covering particles have appropriately different particle sizes, and the covering particles can be bonded to the core particles or other covering particles with high bond strength. Thus, a catalyst layer with a low volume resistivity can be formed.

The material of the core particles in the composite particles may be a metal oxide or silver, and the material of the covering particles in the composite particles may be a carbon material. This allows a three-phase interface for an oxygen reduction reaction to be formed on the surface of each core particle and allows electrons to be supplied to the three-phase interface via the covering particles.

The covering particles in the composite particles may include a plurality of first covering particles mechanically bonded to the surface of each core particle, and a plurality of second covering particles mechanically bonded to other covering particles. This allows the first covering particles and the second covering particles to form an electrically conductive path. Thus, a stable electrically conductive path can be formed. This can also reduce the decrease in discharge voltage even in the case of electrical discharge at a high electric current density.

The covering particles in the composite particles may adhere to the core particles with such strength that 80% or more of the covering particles are not detached from the composite particles after ultrasonication of the composite particles at 20 kHz for 3 minutes. This allows the core particles and the covering particles to be combined and allows the covering particles to form a stable electrically conductive path.

The present disclosure also provides an air electrode containing a catalyst layer. The catalyst layer contains an air electrode material according to the present disclosure and has a volume resistivity of 0.65 Ω·cm or less. Due to the low volume resistivity of the catalyst layer, the air electrode can have low internal resistance.

The present disclosure also provides a metal-air battery that includes an air electrode according to the present disclosure, a metal electrode, and an electrolyte. Due to the low internal resistance of the air electrode, a metal-air battery according to the present disclosure can have good discharging characteristics.

The present disclosure also provides a fuel cell that includes an air electrode according to the present disclosure, a fuel electrode, and an electrolyte. Due to the low internal resistance of the air electrode, a fuel cell according to the present disclosure can have good discharging characteristics.

Some embodiments of the present disclosure will be described below with reference to the drawings. These embodiments illustrated in the drawings and the following description are only examples, and the scope of the present disclosure is not limited to these embodiments.

First Embodiment (Air Electrode Material)

Figure 2:
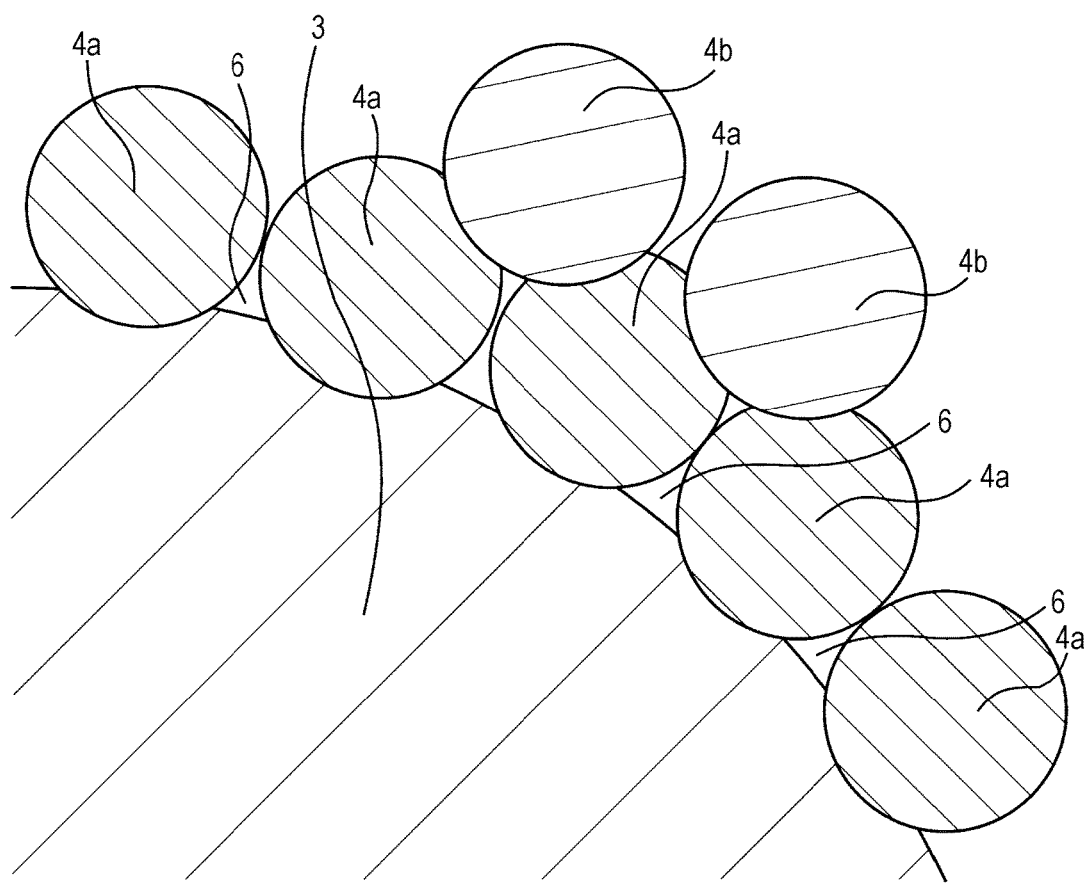
FIG. 2 is a schematic enlarged view of a composite particle in an air electrode material according to an embodiment of the present disclosure.

FIG. 1 is a schematic cross-sectional view of an air electrode material according to the present embodiment. FIG. 2 is a schematic enlarged view of a composite particle in an air electrode material according to the present embodiment.

An air electrode material 5 according to the present embodiment contains composite particles 2. Each of the composite particles 2 contains a core particle 3 and covering particles 4 covering the core particle 3. The core particles 3 are formed of a material with catalytic activity for an oxygen reduction reaction. The covering particles 4 are formed of an electrically conductive material and are mechanically bonded to the core particles 3 or other covering particles 4. The median size of the core particles 3 ranges from 100 to 1000 times the average primary particle size of the covering particles 4.

The air electrode material 5 according to the present embodiment may be a powder, may be one contained in an air electrode of a metal-air battery, or may be one contained in an air electrode of a fuel cell.

Each of the composite particles 2 contains the core particle 3 and the covering particles 4 covering the core particle 3. More specifically, in the composite particles 2, the covering particles 4 are fixed to the surface of the core particles 3. The composite particles 2 can be formed by combining the core particles 3 and the covering particles 4 by a mechanochemical method.

The core particles 3 are formed of a material with catalytic activity for an oxygen reduction reaction. The material of the core particles 3 is a metal oxide or silver, for example. More specifically, the material of the core particles 3 may be a manganese oxide, such as $MnO_2$ or $Mn_3O_4$, Ag, or a perovskite metal oxide. The core particles 3 of the composite particles 2 allow an electrode reaction of the air electrode (an oxygen reduction reaction) to occur on the surface of the core particles 3.

The core particles 3 may have a median size in the range of 3 to 100 μm, preferably 3 to 50 μm.

The median size $D_{50}$ of the core particles 3 can be calculated from the particle size distribution of the core particles 3 contained in the air electrode material 5.

The covering particles 4 are formed of an electrically conductive material. The covering particles 4 cover the surface of the core particles 3. The covering particles 4 can form an electrically conductive path and can promptly supply electrons to the surface of the core particles 3, on which an electrode reaction occurs. The covering particles 4 can also reduce the decrease in discharge voltage even in the case of electrical discharge at a high electric current density.

The covering particles 4 can cover the core particles 3 such that adjacent two covering particles 4 are in contact with each other. A layer or layers of the covering particles 4 may cover each of the core particles 3. A porous layer of the covering particles 4 may cover each of the core particles 3. The covering particles 4 may substantially entirely cover the core particles 3.

The covering particles 4 may be electrically conductive carbon particulates. More specifically, the material of the covering particles 4 may be carbon black, carbon fiber, carbon nanotube, activated carbon, or graphite.

The covering particles 4 may have an average primary particle size in the range of 10 to 100 nm, preferably 10 to 50 nm.

The average primary particle size of the covering particles 4 may be the arithmetic mean size determined by electron microscopic observation.

Each of the composite particles 2 may contain the core particle 3, covering particles 4a mechanically bonded to the surface of the core particle 3, and covering particles 4b mechanically bonded to the covering particles 4a.

The covering particles 4a are mechanically bonded to the core particles 3. The covering particles 4a may be mechanically directly bonded to the core particles 3. For example, the covering particles 4a are partly buried in and engage with the core particles 3 and are thereby bonded to the core particles 3. For example, the covering particles 4a are partly placed in recessed portions of the core particles 3 and engage with the core particles 3 and are thereby bonded to the core particles 3. For example, the covering particles 4a may be partly buried in the core particles 3, as illustrated in FIG. 2.

The covering particles 4a are mechanically bonded to and thereby fixed to the surface of the core particles 3, and can form a stable electrically conductive path. The covering particles 4a can be fixed to the core particles 3 without an adhesive and can therefore form a space 6 between adjacent two covering particles 4a or between the covering particles 4a and the core particles 3. A gas or liquid can enter the space 6. Thus, a gas or liquid can come into contact with the core particles 3 and can stably form a three-phase interface for an electrode reaction. For example, as illustrated in FIG. 2, a gas or liquid can enter a space 6 between adjacent two covering particles 4a and the core particle 3.

The covering particles 4b may be mechanically directly bonded to the covering particles 4a.

For example, the covering particles 4b are partly buried in and engage mechanically with the covering particles 4a and are thereby bonded to the covering particles 4a. For example, the covering particles 4b are partly placed between adjacent two covering particles 4a, engage mechanically with the covering particles 4a, and are thereby bonded to the covering particles 4a. For example, the covering particles 4a may be bonded to the covering particles 4b, as illustrated in FIG. 2.

Since the composite particles 2 contain the covering particles 4b, both the covering particles 4a and 4b can form an electrically conductive path. Thus, a more stable electrically conductive path can be formed. This can also reduce the decrease in discharge voltage even in the case of electrical discharge at a high electric current density.

The core particle 3 may be covered with 2 to 10 layers of the covering particles 4.

The covering particles 4 in the composite particles 2 may adhere to the core particles 3 with such strength (adhesion strength) that 80% or more of the covering particles 4 are not detached from the composite particles 2 after ultrasonication of the composite particles 2 at 20 kHz for 3 minutes. This allows the core particles 3 and the covering particles 4 to be combined and allows the covering particles 4 to form a stable electrically conductive path. Ultrasonication can be performed on an aqueous suspension of the composite particles 2. The proportion of the covering particles 4 not detached from the composite particles 2 after ultrasonication of the composite particles 2 at 20 kHz for 3 minutes is referred to as adhesion strength. For example, the adhesion strength is 80% or more, preferably 85% or more.

The median size of the core particles 3 ranges from 100 to 1000 times the average primary particle size of the covering particles 4. Thus, the core particles 3 and the covering particles 4 have appropriately different particle sizes, and the covering particles 4 can be bonded to the core particles 3 with high bond strength. This was proved in the experiment described later. If the median size of the core particles 3 ranges from 100 to 1000 times the average primary particle size of the covering particles 4, the composite particles 2 can form a catalyst layer with a low volume resistivity, and a metal-air battery with a high discharge voltage can be produced. This was proved in the experiment described later.

The air electrode material 5 containing the composite particles 2 can be produced by applying impact force, compression force, and/or shear force to a mixture of a raw powder of the core particles 3 and a raw powder of the covering particles 4 in a particle composing machine. Applying impact force, compression force, and/or shear force to the mixed powder mechanically binds the covering particles 4 to the core particles 3, thus forming the composite particles 2.

The median size of the raw powder of the core particles 3 can be considered to be the median size of the core particles 3 in the composite particles 2. The average primary particle size of the raw powder of the covering particles 4 can be considered to be the average primary particle size of the covering particles 4 in the composite particles 2.

Second Embodiment (Air Electrode)

Figure 3:
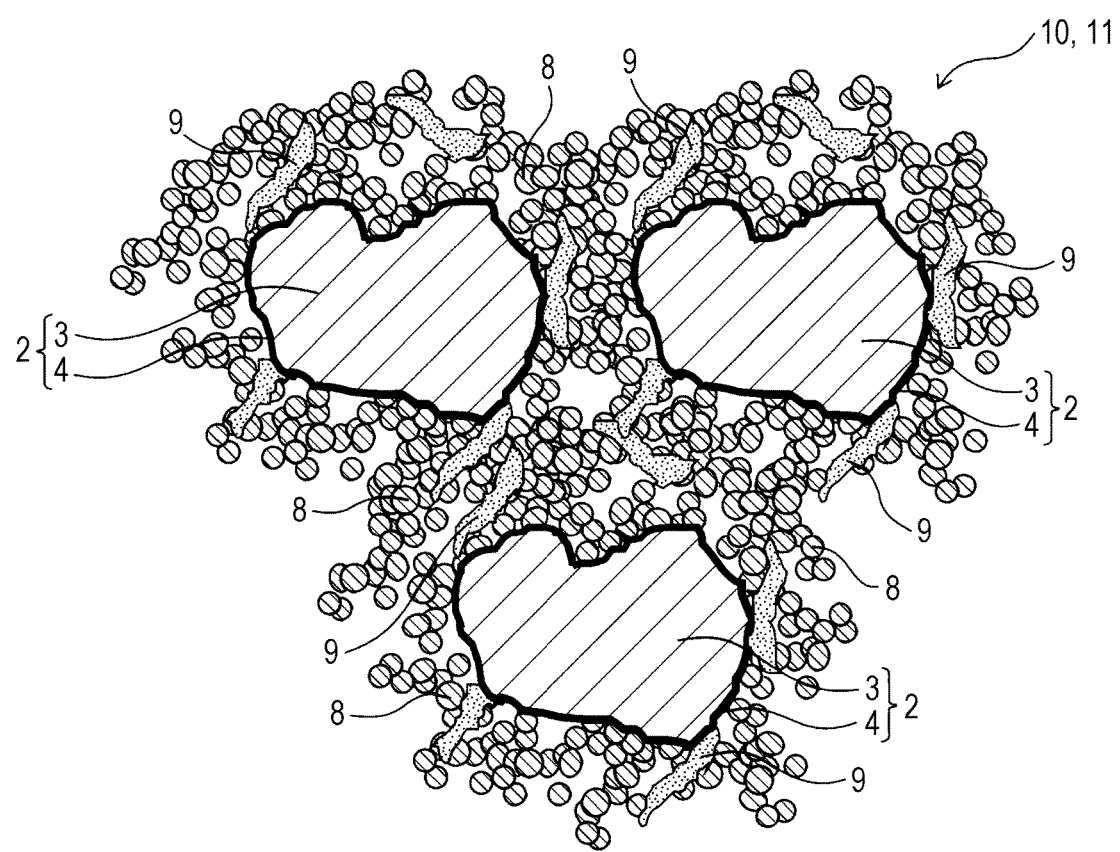
FIG. 3 is a schematic cross-sectional view of a catalyst layer in an air electrode according to an embodiment of the present disclosure.

FIG. 3 is a schematic cross-sectional view of a catalyst layer 10 in an air electrode 11 according to the present embodiment.

The air electrode 11 according to the present embodiment includes the catalyst layer 10, which contains the air electrode material 5 according to the first embodiment. The catalyst layer 10 has a volume resistivity of 0.65 Ω·cm or less, preferably 0.6 Ω·cm or less.

The air electrode 11 according to the present embodiment employs an oxygen gas as an electrode active material and contains a catalyst for an oxygen reduction reaction. The air electrode 11 may be an air electrode of a metal-air battery or an air electrode of a fuel cell.

The air electrode 11 according to the present embodiment can include a current collector. The air electrode 11 according to the present embodiment can include a water-repellent film.

The catalyst layer 10 contains the composite particles 2. Each of the composite particles 2 contains the core particle 3 and the covering particles 4 covering the core particle 3. The core particles 3 are formed of a material with catalytic activity for an oxygen reduction reaction. The covering particles 4 are formed of an electrically conductive material and are mechanically bonded to the core particles 3 or other covering particles 4. The median size of the core particles 3 ranges from 100 to 1000 times the average primary particle size of the covering particles 4.

The catalyst layer 10 can contain an electrically conductive agent 8. The electrically conductive agent 8 can improve the electrical conductivity of the catalyst layer 10.

The electrically conductive agent 8 may be electrically conductive carbon particulates. More specifically, the material of the electrically conductive agent 8 may be carbon black, carbon fiber, carbon nanotube, activated carbon, or graphite. The electrically conductive agent 8 may have an average primary particle size in the range of 10 to 100 nm, preferably 10 to 50 nm. The electrically conductive agent 8 may be the raw powder of the covering particles 4.

The catalyst layer 10 can contain a binder 9. The binder 9 can bind the composite particles 2 and the electrically conductive agent 8 in the catalyst layer 10 and stabilize the characteristics of the catalyst layer 10. The binder 9 may suitably be a fluoropolymer with high alkali resistance. The binder 9 may be polytetrafluoroethylene (PTFE), which grows in a fibrous form, binds particles together, has high water repellency, and is resistant to heat.

The catalyst layer 10 can be formed by kneading the air electrode material 5 according to the first embodiment, the electrically conductive agent 8, the binder 9, and a solvent and by shaping the mixture into a film.

The air electrode 11 can be produced by pressing the catalyst layer 10 and a current collector.

Third Embodiment (Metal-Air Battery)

Figure 4:
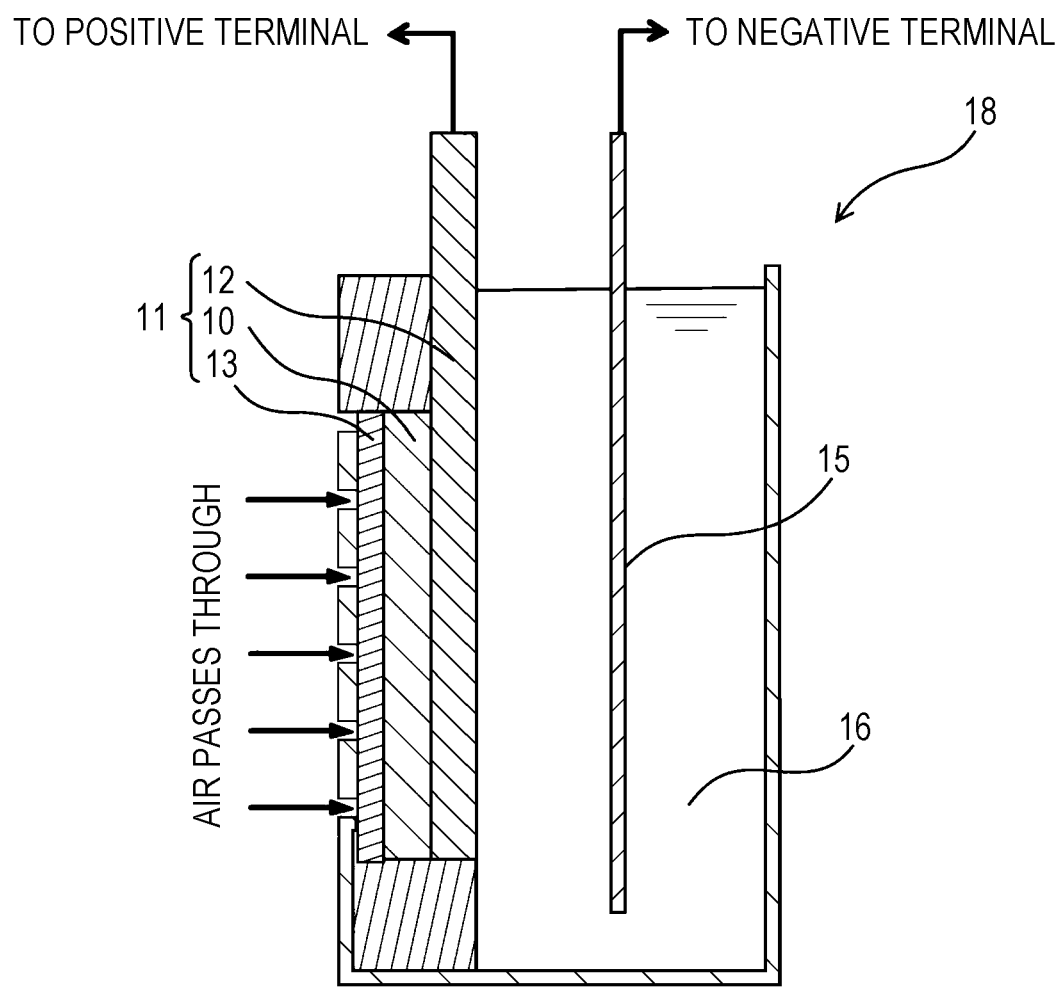
FIG. 4 is a schematic cross-sectional view of a metal-air battery according to an embodiment of the present disclosure.

FIG. 4 is a schematic cross-sectional view of a metal-air battery according to the present embodiment.

A metal-air battery 18 according to the present embodiment includes the air electrode 11 according to the second embodiment, a metal electrode 15, and an electrolyte 16.

The metal-air battery 18 according to the present embodiment includes the metal electrode 15 as a negative electrode (anode) and the air electrode 11 as a positive electrode (cathode). For example, the metal-air battery 18 is a zinc-air battery, a lithium-air battery, a sodium-air battery, a calcium-air battery, a magnesium-air battery, an aluminum-air battery, or an iron-air battery.

For zinc-air batteries, the metal electrode 15 may be formed of metal zinc, and the electrolyte 16 may be aqueous potassium hydroxide.

Fourth Embodiment (Fuel Cell)

Figure 5:
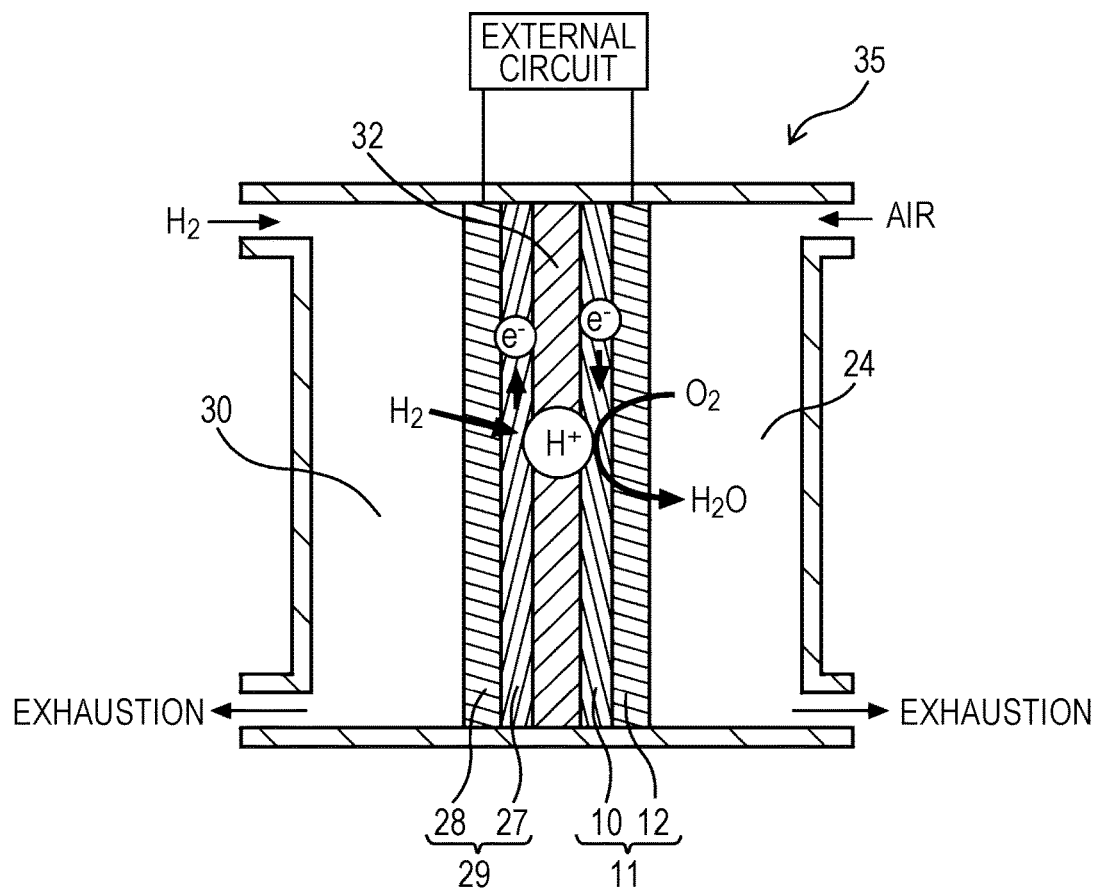
FIG. 5 is a schematic cross-sectional view of a fuel cell according to an embodiment of the present disclosure.

FIG. 5 is a schematic cross-sectional view of a fuel cell 35 according to the present embodiment.

The fuel cell 35 according to the present embodiment includes the air electrode 11 according to the second embodiment, a fuel electrode 29, and an electrolyte 32.

The fuel cell 35 according to the present embodiment may include a cation-exchange membrane or an anion-exchange membrane as a polymer electrolyte membrane.

Experiments

<Preparation of Composite Particles>

A $MnO_2$ powder (trade name: CMD-K200, manufactured by Chuo Denki Kogyo Co., Ltd., median size: 2.5, 3.5, 9.0, 30, or 35 μm) serving as core particles and carbon black (average primary particle size: 19, 30, 48, or 85 nm) serving as covering particles were mixed at a weight ratio of $MnO_2$ powder:carbon black=100:3 to prepare mixed powders according to Examples 1 to 6 and Comparative Examples 1 and 2. The mixed powders had different ratios of the median size of the $MnO_2$ particles to the average primary particle size of the covering particles. The carbon black was "Denka Black" manufactured by Denka Company Limited or "Asahi #50HG" or "Asahi AX-015" manufactured by Asahi Carbon Co., Ltd.

10 g of each of the mixed powders according to Examples 1 to 6 and Comparative Examples 1 and 2 was subjected to impact force, compression force, and/or shear force in a particle composing machine (trade name: Nobilta, manufactured by Hosokawa Micron Corporation) at the number of revolutions and for the processing time listed in Table 1. Thus, powders of composite particles according to Examples 1 to 6 and Comparative Examples 1 and 2 were prepared. The covering particles (carbon black) were mechanically bonded to the surface of the core particles ($MnO_2$ particles) Table 2 lists the ratio of the median size $D_{cat}$ of the core particles to the average primary particle size $D_{cb}$ of the covering particles in the powders of composite particles according to Examples 1 to 6 and Comparative Examples 1 and 2.

TABLE 1

| Amount of charged material | Number of revolutions in Nobilta [rpm] | Processing time in Nobilta [min] |
|---|---|---|
| 10 g | 3500 | 10 |

TABLE 2

| | Median size of core particles $D_{cat}$ [μm] | Average primary particle size of covering particles $D_{cb}$ [nm] | $D_{cat}/D_{cb}$ | Adhesion strength of covering particles [%] | Volume resistivity of catalyst layer [Ω·cm] | Discharge voltage of zinc-air battery [V] |
|---|---|---|---|---|---|---|
| Example 1 | 3.5 | 30 | 117 | 93 | 0.52 | 1.25 |
| Example 2 | 9.0 | 30 | 300 | 95 | 0.45 | 1.23 |
| Example 3 | 30 | 30 | 1000 | 88 | 0.55 | 1.20 |
| Example 4 | 45 | 48 | 938 | 86 | 0.58 | 1.20 |
| Example 5 | 70 | 85 | 815 | 82 | 0.62 | 1.17 |
| Example 6 | 3.5 | 19 | 184 | 89 | 0.54 | 1.21 |
| Comparative example 1 | 2.5 | 30 | 80 | 52 | 0.90 | 1.01 |
| Comparative example 2 | 35 | 30 | 1200 | 68 | 0.71 | 1.12 |

<Evaluation of Adhesion Strength of Covering Particles to Core Particles>

Each of the powders of composite particles according to Examples 1 to 6 and Comparative Examples 1 and 2 was dispersed in water containing 2% by weight of a surfactant to prepare a suspension with a solid content of 5% by weight. The suspension was subjected to ultrasonication for 3 minutes with an ultrasonic homogenizer (output: 20 kHz).

The suspension subjected to ultrasonication was filtered through a filter paper through which the carbon black particles can pass but the composite particles cannot pass. Thus, a residue containing the composite particles was separated from the filtrate containing the carbon black particles detached from the composite particles.

The residue was dried and pressed into a pellet. The pellet of the sample subjected to ultrasonication was subjected to a fluorescent X-ray elemental analysis. An unprocessed sample prepared from the composite particles not subjected to ultrasonication was also subjected to the fluorescent X-ray elemental analysis to compare the carbon component contents. The proportion of carbon black particles not detached from the composite particles by ultrasonication was calculated as "adhesion strength" from the ratio of (the carbon content of the sample subjected to ultrasonication)/(the carbon content of the unprocessed sample). Table 2 lists the adhesion strength of Examples 1 to 6 and Comparative Examples 1 and 2.

The powders of composite particles according to Examples 1 to 6 had an adhesion strength of 80% or more, showing that the covering particles were negligibly detached from the core particles by ultrasonication. This shows that the covering particles adhered strongly to the core particles in the powders of composite particles according to Examples 1 to 6.

In contrast, the powders of composite particles according to Comparative Examples 1 and 2 had an adhesion strength of 70% or less, showing that many covering particles were detached from the core particles by ultrasonication.

These results show that the covering particles adhered strongly to the core particles in the powders of composite particles in which the median size $D_{cat}$ of the core particles ranged from 100 to 1000 times the average primary particle size $D_{cb}$ of the covering particles.

<Formation of Air Electrode Catalyst Layer>

Carbon black (trade name: Denka Black, manufactured by Denka Company Limited, average primary particle size: 30 nm) was added to the powders of composite particles according to Examples 1 to 6 and Comparative Examples 1 and 2 to prepare mixed powders. The amount of the carbon black was 1.5 times the weight of the powders. The carbon black was an electrically conductive agent. Each of the mixed powders was mixed with a binder (PTFE dispersion liquid "D-210C", manufactured by Daikin Industries, Ltd., solvent: water, solid content: 60% by weight) in a planetary mixer to prepare a mixture A. The weight of the binder was 25% of the total solids. The total solid content was adjusted to be 50% by weight with water. The mixture A was kneaded in a mortar to prepare a lump of mixture B. The mixture B was formed into a sheet with a rolling mill to form air electrode catalyst layers according to Examples 1 to 6 and Comparative Examples 1 and 2. The air electrode catalyst layers had a thickness in the range of 100 μm to 2 mm.

Air electrode catalyst layers according to Comparative Examples 3 to 7 were formed from a $MnO_2$ powder (trade name: CMD-K200, manufactured by Chuo Denki Kogyo Co., Ltd., median size: 2.5, 3.5, 9.0, 30, or 35 μm) instead of the powders of composite particles. The other forming conditions were the same as in Examples 1 to 6 and Comparative Examples 1 and 2. Table 3 lists the ratio of the median size of each of the $MnO_2$ powders according to Comparative Examples 3 to 7 to the average primary particle size of the electrically conductive agent (carbon black).

TABLE 3

|  | Median size of $MnO_2$ particles $D_{cat}$ [μm] | Average primary particle size of electrically conductive agent $D_{cb}$ [nm] | $D_{cat}/D_{cb}$ | Volume resistivity of catalyst layer [Ω·cm] | Discharge voltage of zinc-air battery [V] |
|---|---|---|---|---|---|
| Comparative example 3 | 9.0 | 30 | 300 | 0.91 | 1.08 |
| Comparative example 4 | 3.5 | 30 | 100 | 0.93 | 1.01 |
| Comparative example 5 | 30 | 30 | 1000 | 0.70 | 1.02 |
| Comparative example 6 | 2.5 | 30 | 80 | 0.93 | 0.91 |
| Comparative example 7 | 35 | 30 | 1200 | 0.73 | 0.96 |

<Evaluation of Electrical Conductivity of Air Electrode Catalyst Layer>

The volume resistivity of the air electrode catalyst layers according to Examples 1 to 6 and Comparative Examples 1 to 7 was measured with a resistivity meter (Loresta GX MCP-T700 manufactured by Mitsubishi Chemical Analytech Co., Ltd.). Tables 2 and 3 show the results.

The air electrode catalyst layers formed from the powders of composite particles with high adhesion strength according to Examples 1 to 6 had a volume resistivity of 0.65 Ω·cm or less. In contrast, the air electrode catalyst layers formed from the powders of composite particles with low adhesion strength according to Comparative Examples 1 and 2 had a volume resistivity of 0.7 Ω·cm or more.

The air electrode catalyst layers according to Comparative Examples 3 to 7, in which the $MnO_2$ powder and carbon black were not used in combination, had a volume resistivity of 0.7 Ω·cm or more.

These results show that the air electrode catalyst layers formed from the powders of composite particles in which the median size $D_{cat}$ of the core particles ranged from 100 to 1000 times the average primary particle size $D_{cb}$ of the covering particles had a low volume resistivity.

It was also shown that the adhesion strength of the covering particles to the core particles correlates with the electrical conductivity of the air electrode catalyst layers. This proved that adhesion strength is an appropriate indicator of the "result" of the combination of particles.

The air electrode catalyst layers formed from the powders of composite particles according to Examples 1 to 6 had a lower volume resistivity. This shows that the constituent materials of the air electrode catalyst layers had improved dispersion uniformity and that the combination of particles is effective in uniformly dispersing materials with very different particle sizes or specific gravities.

<Production of Air Electrode>

Each of the air electrode catalyst layers according to Examples 1 to 6 and Comparative Examples 1 to 7 was placed on a PTFE surface of a water-repellent film ("Temish" manufactured by Nitto Denko Corporation, front side: PTFE, backing: PP). A current collector (a Ni mesh manufactured by Nilaco Corporation, mesh opening: #20) was placed on the air electrode catalyst layer. The laminate was pressed at normal temperature at 2.15 kN/cm² for 2 minutes to form air electrodes according to Examples 1 to 6 and Comparative Examples 1 to 7.

<Production of Zinc-Air Battery>

Zinc-air batteries including air electrodes according to Examples 1 to 6 and Comparative Examples 1 to 7 were produced, as illustrated in FIG. 4. The electrolyte was aqueous 7 M KOH, and the metal electrode was a zinc plate.

<Evaluation of I-V Characteristics>

The I-V characteristics of the zinc-air batteries according to Examples 1 to 6 and Comparative Examples 1 to 7 were evaluated with a battery tester (battery test system PFX2011 manufactured by Kikusui Electronics Corporation). Tables 2 and 3 list the discharge voltage of each battery at an electric current density of 30 mA/cm².

The zinc-air batteries according to Examples 1 to 6 had a discharge voltage of 1.15 V or more, whereas the zinc-air batteries according to Comparative Examples 1 to 7 had a discharge voltage of 1.12 V or less.

These results show that the zinc-air batteries had a higher discharge voltage when the air electrode catalyst layers were formed from the powders of composite particles in which the median size $D_{cat}$ of the core particles ranged from 100 to 1000 times the average primary particle size $D_{cb}$ of the covering particles.

It was also shown that the adhesion strength of the covering particles to the core particles correlates with the discharging characteristics of the metal-air batteries. This proved that adhesion strength is an appropriate indicator of the "result" of the combination of particles.

The present disclosure contains subject matter related to that disclosed in Japanese Priority Patent Application JP 2016-143465 filed in the Japan Patent Office on Jul. 21, 2016, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An air electrode material comprising:
   a plurality of composite particles,
   wherein each of the composite particles contains a core particle and a plurality of covering particles covering the core particle,
   the core particle is formed of a material with catalytic activity for an oxygen reduction reaction,
   the covering particles are formed of an electrically conductive material and are mechanically bonded to the core particles or other covering particles, and
   a median size of the core particles ranges from 100 to 1000 times an average primary particle size of the covering particles.

2. The air electrode material according to claim 1, wherein the core particles have a median size in the range of 3 to 100 μm, and
the covering particles have an average primary particle size in the range of 10 to 100 nm.

3. The air electrode material according to claim 1, wherein the material of the core particle is a metal oxide or silver, and
the material of the covering particles is a carbon material.

4. The air electrode material according to claim 1, wherein the plurality of covering particles include a plurality of first covering particles mechanically bonded to a surface of the core particle, and a plurality of second covering particles mechanically bonded to other covering particles.

5. The air electrode material according to claim 1, wherein the covering particles adhere to the core particles with such strength that 80% or more of the covering particles are not detached from the composite particles after ultrasonication of the composite particles at 20 kHz for 3 minutes.

6. An air electrode comprising a catalyst layer containing the air electrode material according to claim 1, wherein the catalyst layer has a volume resistivity of 0.65 Ω·cm or less.

7. An metal-air battery comprising:
the air electrode according to claim 6;
a metal electrode; and
an electrolyte.

8. A fuel cell comprising:
the air electrode according to claim 6;
a fuel electrode; and
an electrolyte.

\* \* \* \* \*